Jan. 5, 1960   J. B. ANDERSON   2,920,025
NEUTRONIC REACTORS
Filed Oct. 26, 1956   6 Sheets-Sheet 1

INVENTOR.
John B. Anderson
BY
Roland A. Anderson
Attorney

INVENTOR.
John B. Anderson
BY
Roland A. Anderson
Attorney

Jan. 5, 1960

J. B. ANDERSON 2,920,025

NEUTRONIC REACTORS

Filed Oct. 26, 1956

INVENTOR.
John B. Anderson
BY
Roland A. Anderson
Attorney

Jan. 5, 1960 J. B. ANDERSON 2,920,025
NEUTRONIC REACTORS
Filed Oct. 26, 1956 6 Sheets-Sheet 6

INVENTOR.
John B. Anderson
BY
Attorney

United States Patent Office 2,920,025
Patented Jan. 5, 1960

2,920,025

NEUTRONIC REACTORS

John B. Anderson, West Hartford, Conn., assignor to the United States of America as represented by the United States Atomic Energy Commission Application October 26, 1956, Serial No. 618,661

4 Claims. (Cl. 204—193.2)

The present invention relates to neutronic reactors, and more particularly reactors for the production of useful power.

Power reactors heretofore constructed have been relatively large units. It is one of the objects of the present invention to provide a neutronic reactor for producing useful power which is relatively small in size for the power-producing capacity of the reactor.

One of the reasons that the previously constructed power reactors have relatively large sizes for their capacities is that most reactors employ control elements which are capable of mechanical manipulation relative to the reactor active portion of the reactor. The mechanical drive units used to manipulate these control elements require space themselves, and further, a channel must be disposed within the reactor active portion to accommodate each control element. The presence of these channels increases the size of the active portion of the reactor. In addition, when such control rods are withdrawn from the core during operation, the water channel remaining produces a neutron flux peak which results in a power peak in the adjacent fuel elements. A larger core may be required in order to reduce the heat flux at this power peak to a safe value.

Control elements are generally employed to perform four different functions in the operation of a neutronic reactor. First, control elements are often used to regulate the power level of the reactor. This function requires relatively small reactivity adjustments to maintain the reactivity of the reactor constant under constant power operation conditions. The second use for control elements is to compensate for the excess reactivity initially built into the reactor to overcome equilibrium concentrations of certain poison fission products, such as zenon and samarium. The concentrations of long-lived fission products increase in reactors operating with new fuel charges until they achieve equilibrium concentrations, and it is necessary to continuously decrease the reactivity controlled by control elements during the period increasing concentrations. Third, control elements are often provided in a neutronic reactor to compensate for reactor fuel depletion with operation. The reactor active portion is provided with excess reactivity to permit the reactor to be operated for a substantial period of time, and control elements are utilized to initially overcome this excess reactivity and are adjusted to compensate for this excess reactivity as the reactivity declines. Finally, control elements are provided to hold the reactor in a shutdown condition when it is desired that the reactor should be inoperative. In reactors with negative reactivity to temperature characteristics, more reactivity must be controlled by control mechanisms when the reactor is cold than when operating.

It is a further object of the present invention to provide a neutronic reactor which has a negative reactivity to temperature coefficient of sufficient magnitude to provide reactivity regulation of the reactor without requiring mechanically positionable control elements for this purpose. In previously known reactors, the reactivity to temperature coefficient has never been sufficiently negative to achieve this end. Further, it is an object of the present invention to provide a temperature regulated reactor, i.e., a reactor in which it is not necessary to manipulate control elements to maintain the power level of the reactor constant or vary the power level of the reactor within limits.

It is also a further object of the present invention to provide a novel fuel element which is capable of transferring large quantities of heat from the fuel element to a coolant fluid flowing in thermal contact therewith and which is relatively inexpensive to fabricate.

Control elements for compensating for reactor fuel depletion with operation may be eliminated by the incorporation of "burnable poison" in the reactor core. In such a construction, the atoms of burnable poison are transmuted to atoms of lower absorption cross section simultaneously with the depletion of fuel atoms, thereby essentially canceling any reactivity change resulting from fuel depletion.

A large water channel in a water moderated reactor core, such as occurs when a control rod is removed, will thermalize neutrons without compensating absorption of neutrons. A large source of thermal neutrons is produced thereby for the adjacent fuel elements. This increased neutron flux will result in a power peak and reduce the total safe power producing capability of the core. It is the object of this invention to provide extensions on the control rods of some material such as zirconium that has a relatively neutral effect on the neutron flux, that is, has very low absorption and very low moderation properties. By means of this extension of the control rod of neutral material, the amount of water in the channel is greatly reduced, and the resulting power peak is small.

For a more complete understanding of the present invention, together with additional advantages, reference is made to the following disclosure, particularly when viewed in light of the drawings, in which:

Figure 7 is a sectional view taken along the line 7—7 of Figure 6;

Figure 1:
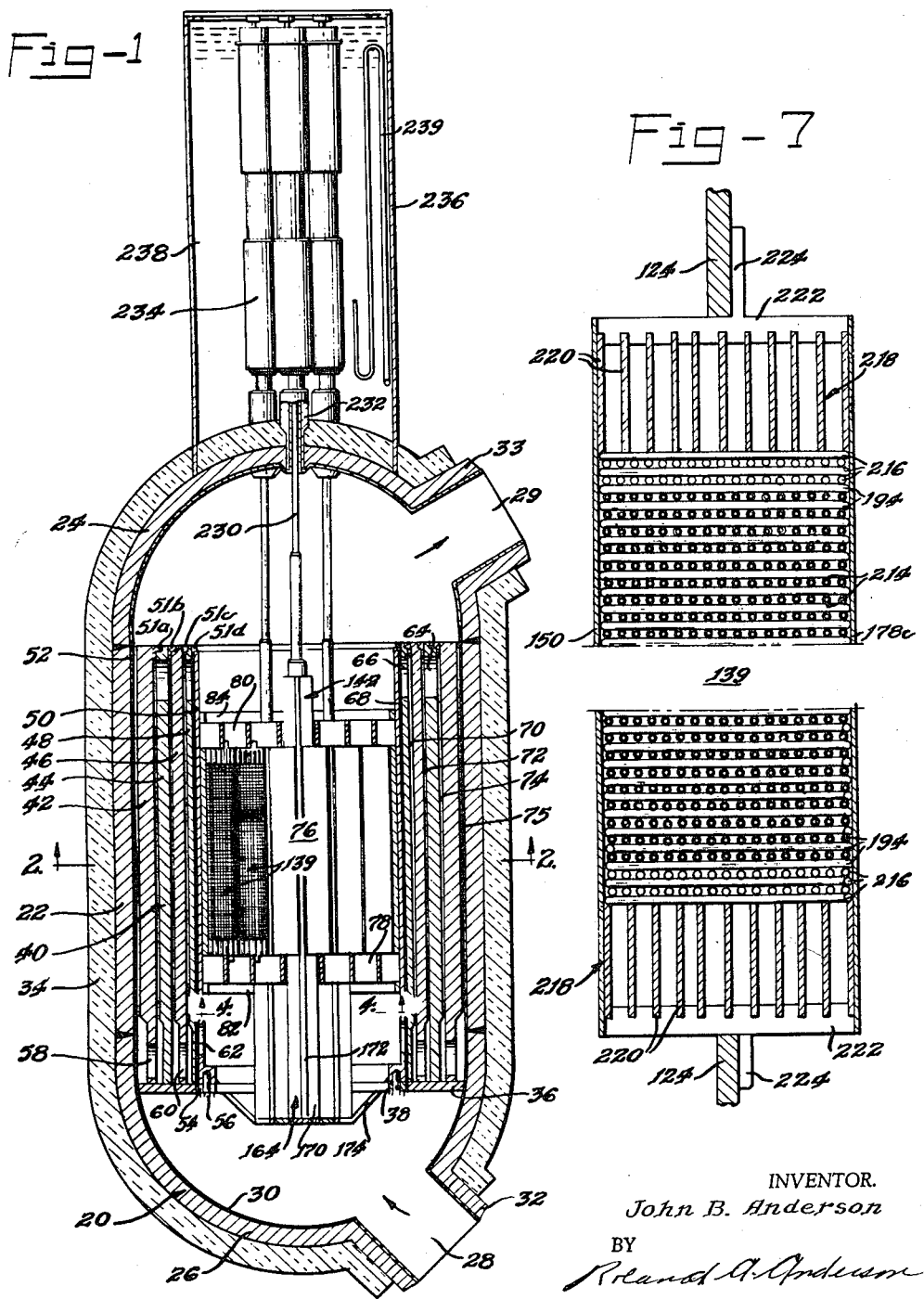
Figure 1 is a longitudinal sectional view of a reactor constructed according to the teachings of the present invention.

Referring to Figure 1, the reactor employs a pressure vessel 20 with a cylindrical portion 22 and hemispherical end portions 24 and 26 sealed to opposite ends of the cylindrical portion 22. A coolant inlet port 28 is disposed in the hemispherical end portion 26 at a 45° angle relative to the axis of the pressure vessel, and a coolant outlet port 29 is disposed in the other end portion 24 on the same plane as the port 28 and at an angle of 60° relative to the axis of the pressure vessel 20. The cylindrical portion 22 and two end portions 24 and 26 are permanently secured together by welding, and the interior surfaces of the pressure vessel 20 are provided with a stainless steel layer 30. The inner radius of the cylindrical portion 22 and the hemispherical end portions 24 and 26 are 19 7/16 inches, and the thickness of the pressure vessel walls is 2 1/4 inches. The pressure vessel is designed to retain a pressure of 3500 p.s.i. at 800° F. and to operatae at a normal operating pressure of 3000 p.s.i. It is constructed of a high strength alloy steel (U.S. Steel alloy "Carriloy T-1"). The layer 30 is 1/8 inch thick and AISI type 347 stainless steel for corrosion protection. The length of the pressure vessel measured along its central axis is 7 feet, 6 3/8 inches between confronting inner surfaces.

The inlet port 28 and outlet port 29 are provided with nozzles 32 and 33, respectively, which are sealed to the ports by welding and have an inner diameter of 10 inches and an outer diameter of 14 inches. A layer 34 of thermal insulating material entirely surrounds the pressure vessel 20. It is clear that the all welded construction of the pressure vessel 20 and the absence of access ports to the fuel elements in the pressure vessel facilitate the construction of a pressure vessel to retain 3000 p.s.i., but limit the life of the reactor to its critical period with its initial fuel charge. As will be explained hereinafter, this reactor will remain critical for a period of time in excess of 2000 hours of full power operation, and it is deemed to be economical for military applications to dismantle the pressure vessel of the reactor by breaking the weld between the hemispherical end 24 and the cylindrical portion 22 of the pressure vessel 20 to recover the depleted fissionable material disposed within the reactor pressure vessel and replace the fuel elements.

A base ring 36 is secured to the hemispherical end 26 normal to the axis of the pressure vessel 20, for example, by welding, and has a central aperture 38. A thermal shield 40 consisting of 5 concentric sleeves 42, 44, 46, 48 and 50, is mounted coaxially within the cylindrical portion 22 of the pressure vessel 20 and secured to the base ring 36, the sleeves 42, 44, 46 and 48 being welded to the base ring 36 at one end and to annular rings 51a, 51b, 51c and 51d disposed between the ends of the sleeves 42 and 44, 44 and 46, 46 and 48, and 48 and 50, respectively. A rim 52 is also disposed between the cylindrical portion 22 of the pressure vessel 20 and the outer sleeve 42, and the inner sleeve 50 is secured to the base ring 36 by a mounting flange 54 adjacent to the aperture 38 and a plurality of bolts 56 extending through the flange 54 into the inner sleeve 50. Sleeves 42, 46 and 50 are provided with a plurality of apertures 58, 60 and 62, respectively, adjacent to the base ring 36, and sleeves 44 and 48 are provided with apertures 64 and 66, respectively, adjacent to the opposite end of the sleeves.

Figure 2:
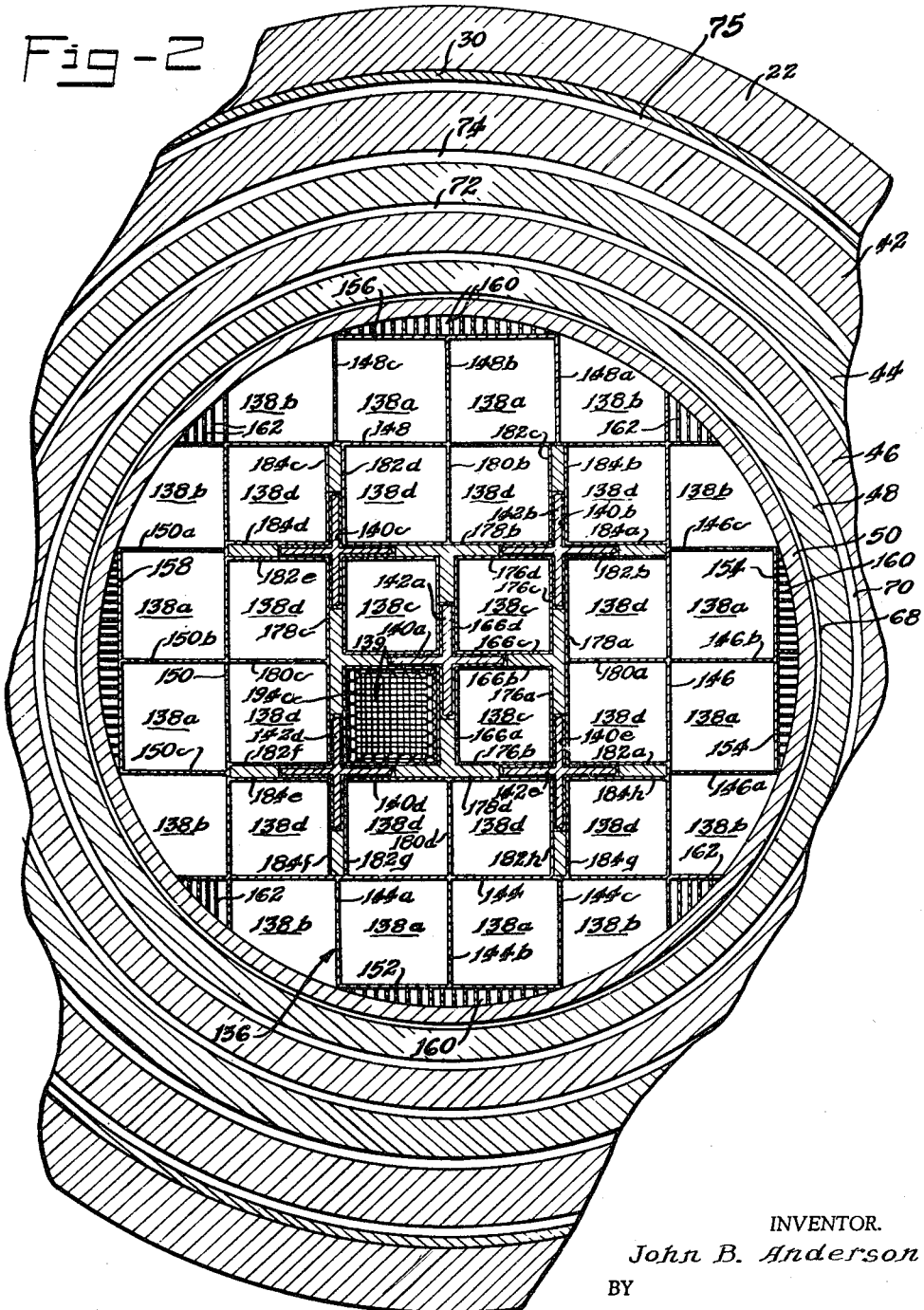
Figure 2 is a transverse sectional view taken along the line 2—2 of Figure 1.

As shown in Figures 1 and 2, each of the concentric sleeves is spaced from adjacent sleeves by a distance of 1/4 inch to permit the flow of coolant between the sleeves. The coolant enters the apertures 62 adjacent to the base ring 36 of the inner sleeve 50, flows upwardly through the channel 68 between the sleeves 50 and 48, through the apertures 66 in the sleeve 48, through the channel 70 between the sleeves 46 and 48, through the apertures 60 in the sleeve 46, and thence through the channel 72 between the sleeves 44 and 46, through the apertures 64 in the sleeve 44, and thence through the channel 74 between the sleeve 44 and 42, through the aperture 58 in the sleeve 42, and thence through the channel 75 between the sleeve 42 and the cylindrical portion 22 of the pressure vessel 20; the coolant flow exiting into the hemispherical end portion 24 of the pressure vessel 20. Each of the channels 68, 70, 72, 74 and 75 are 1/4 inch wide, and the sleeves 42, 44, 46, 48 and 50 are constructed of stainless steel. The inner sleeve 42 has a thickness of 2 1/8 inches, sleeve 44 a thickness of 1 5/8 inches, sleeve 46 a thickness of 1 1/4 inches, sleeve 48 a thickness of 15/16 inch, and sleeve 50 a thickness of 5/8 inch. All of the sleeves are of the same length, namely, 51 1/2 inches.

Figure 3:
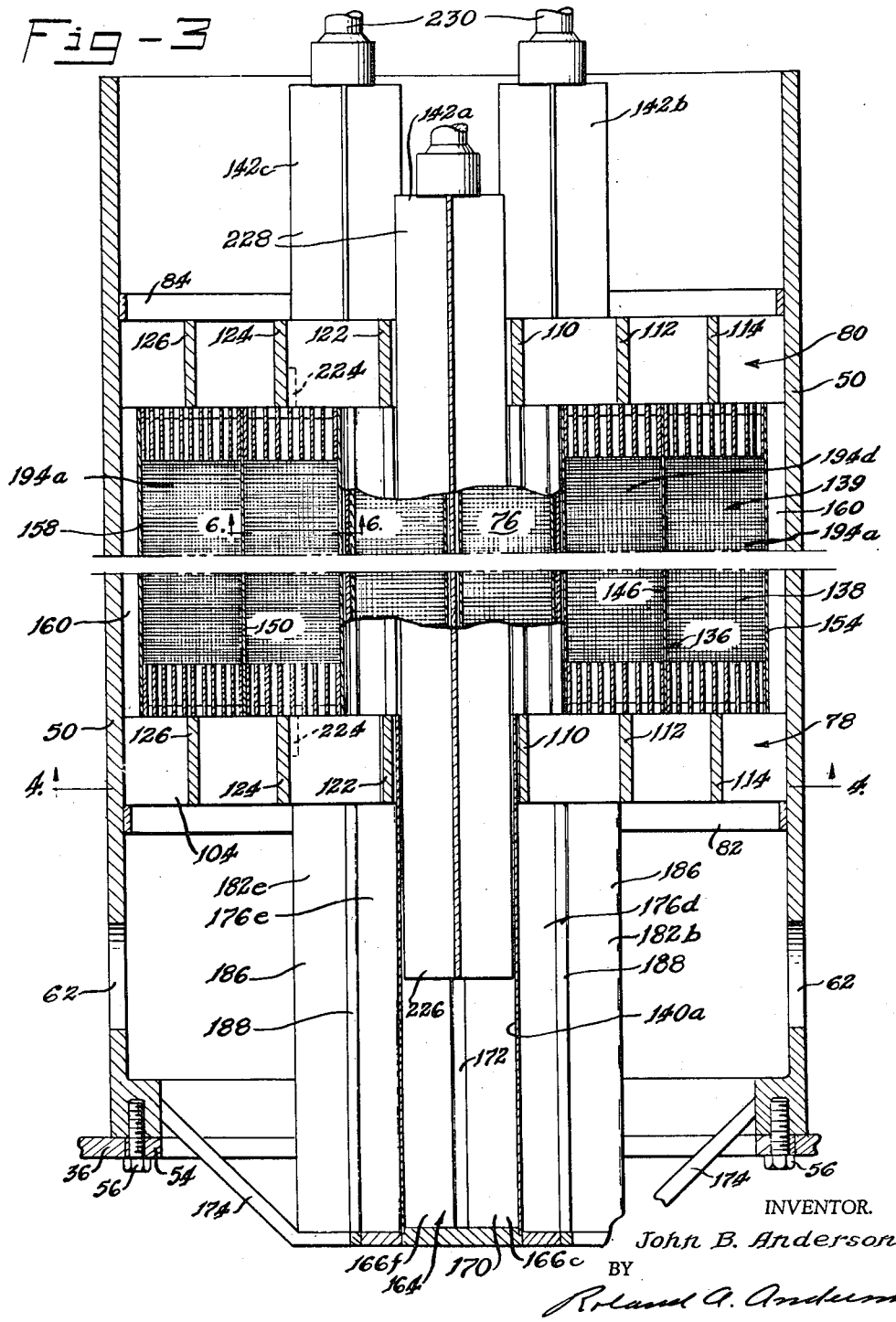
Figure 3 is an enlarged longitudinal sectional view of a portion of the reactor core illustrated in Figure 1.
Figure 4:
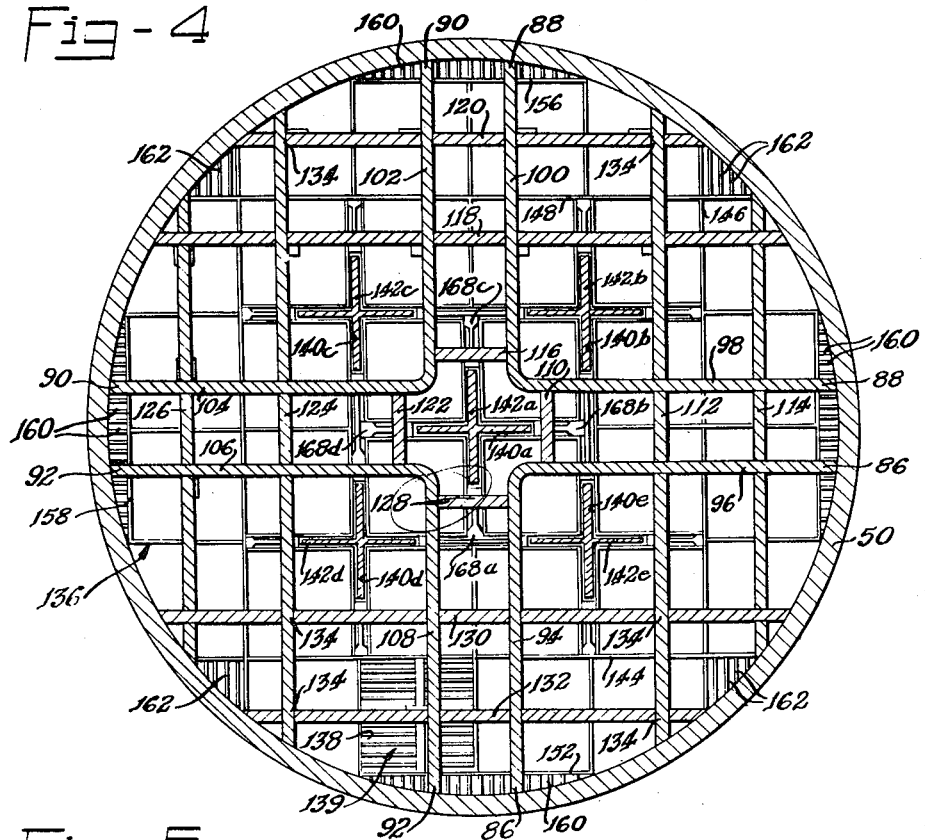
Figure 4 is a sectional view taken along the line 4—4 of Figure 3.

The reactor core, designated 76, is supported by the inner sleeve 50. A pair of support grids 78 and 80 are mounted to the inner sleeve 50 normal to the axis of the pressure vessel 20 by a pair of retaining rings 82 and 84 which are welded to the sleeve 50. Each of the grids 78 and 80 are constructed in identical form, as illustrated in Figures 1, 3 and 4, Figure 4 showing grid 78. Each of the grids 78 and 80 has four strips 86, 88, 90 and 92, provided with right angle bends at their centers forming legs which are shorter than the inner radius of the inner sleeve 50. The legs of strip 86 are designated 94 and 96, and are disposed with their ends abutting the inner sleeve 50. Strip 88 has legs 98 and 100 which abut the inner sleeve 50, and leg 98 is parallel with leg 96 of the strip 86. In like manner, strip 90 has legs 102 and 104, and strip 92 has legs 106 and 108, leg 102 being parallel with leg 100, leg 104 being parallel with leg 106, and leg 108 being parallel with leg 94 of strip 86. Leg 96 is secured to leg 98 by three plates 110, 112, and 114 which extend between the plates normal thereto and are secured to the plates, by welding for example. In like manner legs 100 and 102 are interconnected by plates 116, 118 and 120, legs 104 and 106 are interconnected by plates 122, 124, and 126, and legs 108 and 94 are interconnected by plates 128, 130 and 132. Plates 112, 114, 124 and 126 extend beyond the legs of the strips to abut the inner sleeve 50, as do plates 118, 120, 130 and 132 which are disposed normal to the plates 112, 114, 124 and 126, thus forming intersections, designated 134. The intersecting plates at each intersection 134 are secured together, as by welding, for example, thus forming a rigid grid. The grids 78 and 80 are identical and corresponding parts of each grid confront each other.

A channeled support structure 136, shown in Figures 1 through 4, is disposed between the grids 78 and 80 and provides 32 channels 138 for fuel elements 139 and 5 channels 140 for cruciform control rods 142, the channels 138 and 140 being disposed parallel to the axis of the pressure vessel 20. As shown in Figures 2 and 4, channeled structure 136 has four normally intersecting walls 144, 146, 148 and 150 which abut the inner sleeve 50 at their ends and form a hollow rectangle. Each of the walls 144, 146, 148 and 150 supports three plates 144a, and 144b, and 144c; 146a, 146b and 146c; 148a, 148b, and 148c; and 150a, 150b, and 150c, respectively, which extend toward the inner sleeve 50 normal to the walls 144, 146, 148 and 150. These plates are equally spaced from each other along the length of the walls between the intersections thereof to form 4 fuel channels 138 between each wall 144, 146, 148 and 150, and the confronting inner sleeve 50. The central two fuel channels 138a adjacent to each wall are rectangular in shape and are completed by a wall 152, 154, 156, and 158, parallel to wall 144, 146, 148 and 150, respectively. The region between these walls 152, 154, 156 and 158 and the confronting surface of the inner sleeve 50 is filled with stainless steel filler pieces 160, and the region between the inner sleeve 50 and the portion of walls 144, 146, 148 and 150 from the intersections to the sleeve 50 is also filled with stainless steel filler pieces 162. The fuel channels 138b which are adjacent to the filler pieces 162 are not rectangular in shape, a portion of two of the sides of these channels 138b being formed by the inner sleeve 50.

As illustrated in Figures 2 and 4, there are five cruciform control rods 142 in the reactor core 76, one of these rods 142a having an axis coinciding with the axis of the pressure vessel 20 and being slidably disposed in a channel 140a extending through the grids 78 and 80 between the plates 110, 116, 122, and 128. The control rod 142a is shrouded in a casing 164 having eight elongated plates 166a, 166b, 166c, 166d, 166e, 166f, 166g and 166h, plates 166a and 166b, 166c and 166d, 166e and 166f, and 166g and 166h, being attached to each other at right angles and disposed parallel to the axis of the pressure vessel 20. The plates are secured together to form the X-shaped control channel 140a by a stainless steel spacer 168a disposed between the plates 166h and 166a, a stainless steel spacer 168c disposed between plates 166b and 166c, a stainless steel spacer 168c disposed between plates 166d and 166e, and a stainless steel spacer 168d disposed between plates 166f and 166g, the spacers being disposed adjacent to the edges of the plates opposite to the intersecting plate edges. The plates extend between the grid 78 and the grid 80, as illustrated in Figures 1 and 3, and are provided with narrow portions 170 which extend through the grid 78 into the hemispherical end 26 of the pressure vessel 20. A sealing strip 172 is sealed between the narrow portions of plates 166a and 166h, 166b and 166c, 166d and 166e, 166f and 166g to form a cruciform shroud for the control rod channel 140a. A support structure 174 is secured to the end of the narrow portion 170 of the plates 166, and is also fastened to the adjacent portions of the sleeve 50 in order to support these control rod shrouds.

Within the region between the grids 78 and 80 illustrated in Figures 2 and 3, plates 176a and 176b are secured normal to each other and secured to the plates 166a and 166b forming a rectangular fuel channel 138c. In like manner plates 176c and 176d are secured to each other normally and to the plates 166c and 166d to form another fuel channel 138c. Also, plates 176e and 176f are mounted normal to each other and sealed to the plates 166e and 166f to form another rectangular fuel channel 138c; and plates 176g and 176h are sealed normal to each other and to the plates 166g and 166h to form another rectangular fuel channel 138c. The fuel channels 138c are rectangular, identical in size, and smaller than the fuel channels 138a.

A plate 178a extends parallel to the plates 176a and 176c and is spaced from these plates. In like manner a plate 178b is spaced from the parallel to the plates 176d and 176e; a plate 178c is spaced from and parallel to the plates 176f and 176g; and a plate 178d is spaced from and parallel to the plates 176h and 176b. A divider plate 180a is sealed to the plate 178a along a line midway between the ends of the plate and extends normally from the plate 178a to intersect the wall 146. In like manner a divider plate 180b is sealed to the plate 178b and extends normal thereto to intersect the wall 148. A divider plate 180c is sealed centrally of the plate 178c and extends normal thereto to intersect the wall 150; and a divider plate 180d is sealed centrally of the plate 178d and extends normally thereto to intersect the wall 144 centrally. In this manner the fuel channels 138d are formed. These channels are rectangular, of identical size, and slightly larger than the fuel channels 138c.

Shroud plates 182a and 182b extend normally from the ends of the plate 178a to the wall 146, and shroud plates 182c and 182d extend normally from the plate 178b to the wall 148. In like manner shroud plates 182e and 182f are sealed normally to the ends of the plate 178c and extend to wall 150 and shroud plates 182g and 182h are sealed to the ends of the divider of plate 178d and extend to wall 144, respectively. Shroud plates 184a and 184b are sealed together at right angles and disposed parallel to and spaced from the shroud plates 182b and 182c, these shroud plates 184a and 184b intersecting and being sealed to walls 146 and 148, respectively. In like manner, shroud plates 184c and 184d are sealed normally to each other and disposed parallel to and spaced from the shroud plates 182d and 182e, these plates 184c and 184d intersecting and being sealed to the walls 148 and 150, respectively. Further, shroud plates 184e and 184f are sealed together normally and disposed parallel to and spaced from the shroud plates 182f and 182g, and are sealed to the walls 150 and 144, respectively. Also, shroud plates 184g and 184h are sealed to each other normally and disposed parallel to and spaced from the shroud plates 182h and 182a. In this manner four fuel channels 138d are formed. Control rod channels 140b, 140c, 140d and 140e are formed in a rectangular lattice disposed at the same distance from the central control rod channel 140a.

The shroud plates 182a, 182b, 182c, 182d, 182e, 182f, 182g, and 182h, and 184a, 184b, 184c, 184d, 184e, 184f, 184g and 184h have narrower sections 186 which extend through the grid 78 to the supporting structure 174, in a manner similar to the extending portions 170 of plates 166a, 166b, 166c, 166d, 166e, 166f, 166g, and 166h which form control rod channel 140a. Further, sealing strips 188 are disposed between the ends of the shroud plates to seal the X-shaped channels. An X-shaped control rod 142b, 142c, 142d and 142e is disposed in the channels 140b, 140c, 140d and 140e, respectively.

Figure 5:
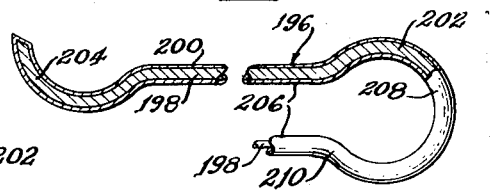
Figure 5 is a fragmentary sectional view, partly in elevation, of a portion of one of the fuel grids.
Figure 6:
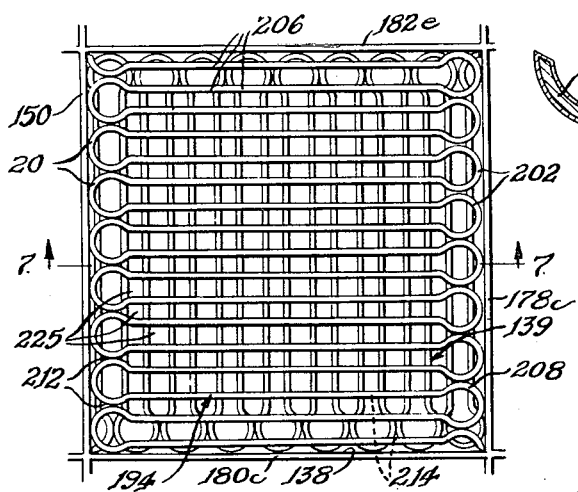
Figure 6 is a transverse sectional view of one of the fuel elements of the reactors taken along the line 6—6 of Figure 3.

Each of the fuel channels 138 contains a fuel element 139. As best illustrated in Figures 5 through 7, the fuel elements are constructed with a plurality of grids 194 which are formed by wires 196. Each of the wires 196 has a core 198 which contains uranium in the form of $UO_2$ particles finely dispersed in a boron and stainless steel matrix, the core 198 having 17.6 weight percent $UO_2$ and 82.4% stainless steel and boron matrix. The uranium in the $UO_2$ contains 93.7% $U^{235}$ and 6.3% $U^{238}$ by weight. The matrix contains boron with the isotopic content found in nature alloyed with stainless steel in the amount of 0.10% boron by weight and 82.3% stainless steel by weight. The effect and purpose of the boron will be described later in this disclosure. The wires 196 are also provided with a cladding 200 of stainless steel, the diameter of the wires being 0.060 inch, the diameter of the core 198 being 0.050 inch, and the thickness of the cladding being 0.005 inch.

As illustrated in Figures 5 and 6 each of the grids 194 is formed by providing a single wire 196 with a plurality of bends 202 and 204 in opposite directions, thus providing straight interconnecting legs 206, between adjacent bends 202 and 204. Each of the bends 202 and 204 has a circular portion 208 which extends throughout an arc of approximately 270° and a pair of reverse bends 210 of approximately 45° each which place the two legs 206 emerging from each bend 202 and 204 parallel with each other. In each grid 194, the bends 202 and 204 and legs 206 lie in a common plane, and adjacent bends 202 and 204 abut each other at points 212 which are secured together, for example by brazing, in order to provide structural strength to the grids 194. Adjacent grids 194 are disposed with their legs 206 normal to each other forming a plurality of contact points 214 between adjacent grids 194. These contact points 214 are also secured together as by brazing for example.

Adjacent to both ends of stack of fuel grids 194 are four grids 216 which contain no fissionable material, best illustrated in Figure 7, these grids being entirely constructed of stainless steel, but being identical in form with the grids 194. The four grids 216 are alternately oriented at an angle of 90° with respect to each other in the same manner as the grids 194 in the fuel section of the fuel elements 139.

The stack of grids 194 and 216 are disposed between transition sections 218 constructed of stainless steel. Each of the transition sections 218 has a plurality of plates 220 which are disposed parallel to each other and normal to the plane of the grids 194 and 216. The plates 220 abut the confronting grid 216 at each end of the stack of grids 216 and 194 and maintain the grids 194 and 216 securely within the walls of the fuel channels 138. Each of the transition section 218 has a transverse member 222 disposed normally to the plates 220 and secured thereto. The transverse member 222 maintains the plates 220 in parallel rigid relationship and has an outwardly extending rib 224 for securing the transition section 218 to one of the support grids 78 or 80. In the fuel element illustrated in Figure 7, the ribs 224 are welded to the plates 124 of the grids 78 and 80, and the ribs 224 are also welded to the back side of the leg 104, as illustrated in Figure 3. The transition support sections 218 perform the function of securing the stack of grids 194 and 216 rigidly in place within the fuel channels 138 and also establishing a non-turbulent water flow in the exiting water from the fuel elements 139 and maintaining a non-turbulent water flow into the fuel elements 139.

The fuel elements 139 provide water passages 225 between the legs 206 of each grid measuring 0.074 to 0.080 inch. Also the ratio of uranium to water in the reactor core 76 constructed as disclosed is 1 to 1.7.

In the particular construction here disclosed, the cladding 200 for the fuel wires 196 consists of AISI type 309 stainless steel, and the stainless steel matrix of the core 198 of the fuel wire 196 is also type AISI 309 stainless steel. However, it is to be understood that other materials may also be used, such as zirconium with slightly different reactivity effects.

Figure 2 illustrates that the fuel channels 138 are of four different types 138a, 138b, 138c, and 138d. The fuel channels 138c are rectangular channels of smaller size than the rectangular channels 138d, and the rectangular channels 138d are in turn smaller than the rectangular channels 138a. Fuel elements, hereafter designated 192c, 192d, and 192a are fabricated to fit in these channels 138c, 138d and 138a, respectively. In the reactor described throughout this disclosure, each of the fuel channels 138c has a cross section measuring $3^{35}/_{64}$ inches. The grids, designated 194c which are disposed in these fuel channels 138c have cross sectional dimensions of 3.344 inches by 3.344 inches, thus providing a small clearance between the grids 194a and the adjacent walls of the channels. The ends of the wire 196 are also sealed by brazing, and each of the bends 202 and 204 is provided with a 0.0078 inch inner radius. Also, the legs 205 of the grids are spaced from each other by a distance of approximately 0.078 inch. There are total of 343 grids in each fuel assembly. In addition, there are four grids 216 which do not contain the core of fissionable material but consist solely of stainless steel which are disposed at each end of the stack of grids 194c, thus providing a total grid height of 21 inches.

There are 12 fuel channels 138d which have square dimensions of $3^{5}/_{8}$ inches by $3^{5}/_{8}$ inches. Grids 194d are disposed in the fuel channels 138d and have cross-sectional dimensions of 3.554 inches by 3.554 inches. There are eight channels 138a having square cross sections measuring $3^{47}/_{64}$ inches by $3^{47}/_{64}$ inches which contain fuel grids 194a measuring 3.564 inches by 3.564 inches. In addition, there are grids designated 194b which are disposed in the fuel channels 138b which essentially fill these irregular channels. In total, there are 10,944 grids 194 and 256 dummy grids 216. The total length of the wire 196 is 78,250 feet, giving a $U^{235}$ content of 36 kilograms. The metal (fuel elements and structural members) to water volume ratio of the reactor is 1 to 1.7.

The core 76 is in the form of a right cylinder and has an average diameter of 22.9 inches and an active height of 20.5 inches. In order to achieve the desired negative coefficient, one of the cross sectional dimensions of the core must be less than 3 feet. The thermal shield 40 provides nine inches of steel and 1¼ inches of water radially, and primarily water axially, thus achieving an axial reflector savings of 7 centimeters and a radial reflector savings of 12 centimeters. Each of the plates separating the fuel channels 138 is $1/_{16}$ inch thick type AISI 309 stainless steel.

The control rods 142a, 142b, 142c, 142d and 142e are of identical construction, although the control rod 142a located on the axis of the core 76 is designated a "shim" rod and the control rods 142b, 142c, 142d and 142e are designated "shut down and safety" rods. The five control rods 142 are of cruciform shape with a span of 3.75 inches and a thickness of 0.219 inch. The total length of the control rods 142 is 41 inches, this length being divided into two sections 226 and 228. The lower section 226 has a length of 20.5 inches and consists of solid hafnium, while the upper section 228 has a length of 20.5 inches and consists of zirconium. This zirconium extension is for the purpose of displacing water in the channel when the hafnium portion of the rod is removed from the core, thereby preventing high heat flux peaks adjacent to the water channels that limit the heat transfer design by increasing the burn out potential of the fuel element. Control rod drive shafts 230 are secured to the upper section 228. The drive shafts 230 extend through bearings 232 in the hemispherical portion 24 of the pressure vessel 20 and connect to control rod drive mechanisms 234 on the exterior of the pressure vessel 20. The control rod drive mechanisms 234 are mounted in a protecting container 236 in which the spaces between the drive mechanisms 234 in the container 236 are filled with oil 238. The control rod drive mechanisms 234 are fully disclosed in the application of Joseph N. Young, Serial Number 548,555, filed November 22, 1955 entitled "Electromagnetic Apparatus for Moving a Rod," now Patent No. 2,831,990, and reference is made thereto. A cooling coil 239 is also disposed within the container 236 and immersed in the coil 238. The coil 239 is provided with a water flow in order to limit the operating temperature of the drive mechanisms 234.

Figure 8:
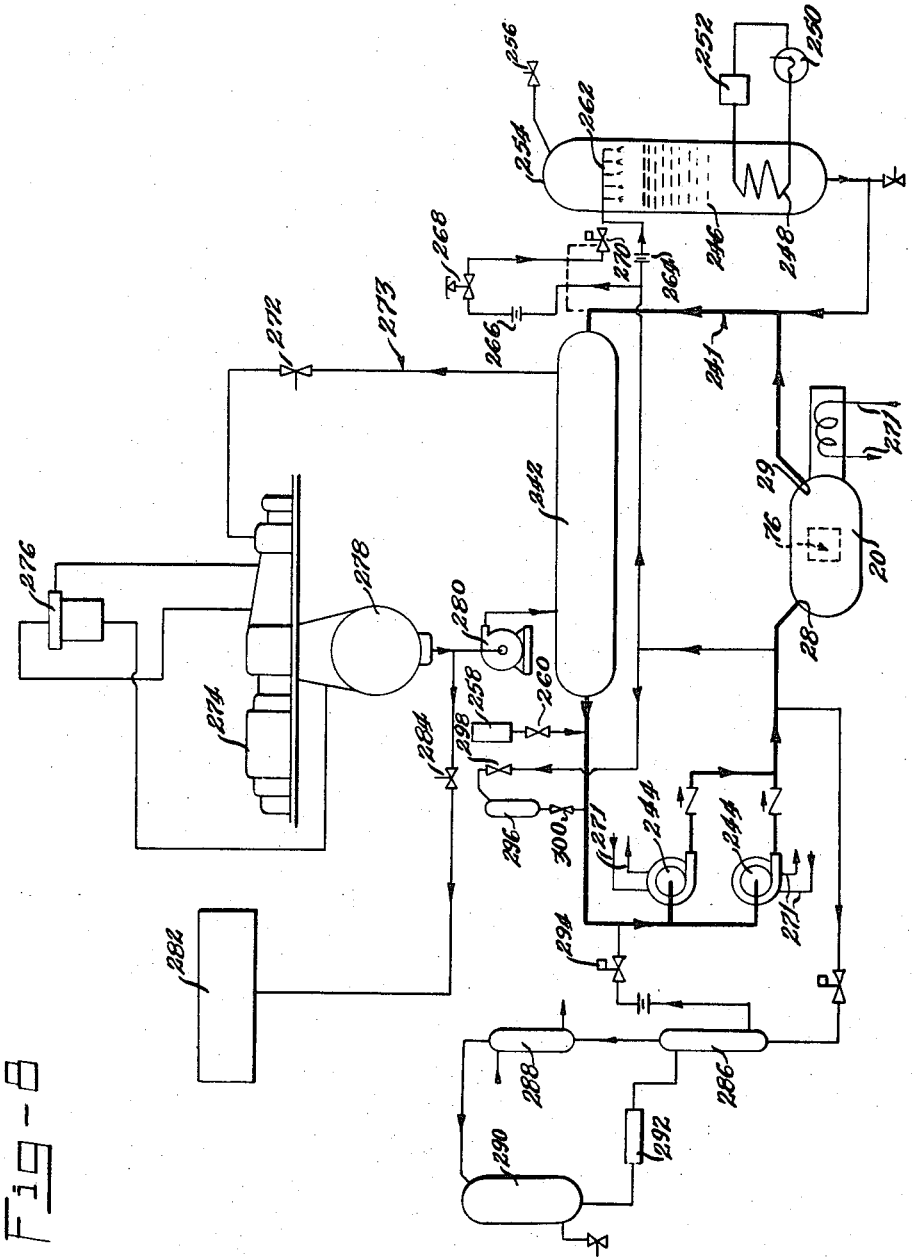
Figure 8 is a schematic flow diagram of the coolant circuit for the reactor shown in Figures 1 through 7.

Figure 8 is a flow diagram of the coolant circuit for the reactor shown in Figures 1 through 7. The pressurized coolant water for the reactor is circulated through a primary coolant loop 241 which includes the reactor pressure vessel 20, a steam generator 242 connected to the inlet port 28 and outlet port 29 of the pressure vessel 20 and a pair of pumps 244 connected in parallel between the steam generator 242 and the inlet port 28 of the pressure vessel 20. The outlet port 29 of the pressure vessel 20 is also connected to a pressurizing and surge tank 246 which is provided with an electric heater 248 adjacent to the bottom thereof. The heater 248 is connected to a 440 volt 80 kw. electrical generator 250 through a pressure-actuated control device 252 which maintains the pressure in the surge tank 246 at 3000 p.s.i. The surge tank 246 has a dome 254, and a pressure release valve 256 is connected into the dome 254 to release pressures over 3500 lbs./sq. inch.

A source of hydrogen 258 is connected between the pumps 244 and the steam generator 242 through a valve 260, and sufficient hydrogen is inserted into the primary coolant flow, and becomes dissolved therein, to serve as a corrosion inhibitor. A hydrogen gas concentration of 100 cc./kg. of water in the primary coolant loop has been found to provide satisfactory corrosion inhibition. A spray 262 is disposed within the dome 254 of the surge tank 246 above the level of the water in the surge tank. The spray 262 is connected into the primary coolant loop 241 between the pumps 244 and the inlet port 28 of the pressure vessel 20 in order to bleed a portion of the primary coolant water from this circuit and spray the water into the dome 254 of the surge tank 246, thus preventing the collection of hydrogen gas in the dome and assuring adequate concentrations of hydrogen in solution with the water in the primary coolant loop. This bleeding circuit is divided into two parallel portions, the one portion having only an orifice 264 and the other parallel portion an orifice 266, a flow-proportioning valve 268, and a pressure-responsive valve 270 which is linked to the pressure of the water in the primary coolant loop. Thus, the water from the spray 262 is relatively small in the absence of an overpressure signal opening the valve 270. In this manner, the electrical heater 248 is not required to deliver as much thermal power as if a spray of continuous volume were used.

The water in the surge tank 246 is maintained at a temperature of approximately 695° F. by the heater 248 while the water coming from the outlet port 29 of the pressure vessel 20 is 650° F. and the water entering the pressure vessel through the inlet port 28 is 584° F. The heater 248 thus is required to maintain the temperature of the surge tank 246. The pumps 244 deliver a constant volume of water to the reactor pressure vessel 20. Separate cooling loops 271 are provided for the pumps 244 and coil 239 in the control housing 236 to maintain the temperature of these units at tolerable limits.

Steam emerges from the steam generator 242 in the secondary loop 273 and flows through a valve 272 to a steam turbine 274. The steam turbine 274 has a high and low pressure stage, and a moisture separator 276 is connected between these stages. The condensate removed by the separator 276 flows to a condenser 278 which is also connected to the stages of the turbine 274. The condenser 278 is also connected to the inlet end of the steam generator 242 through a pump 280. The pump 280 is also a constant volume pump.

If the reactor is operating at a constant power level and delivering a particular volume of steam to the turbine 274, an increase in the power level of the reactor is achieved by further opening the valve 272, thereby causing a demand for additional steam and reducing the temperature of the primary coolant emerging from the steam generator 242 and entering into the reactor inlet port 28. As a result, the reactivity of the reactor is increased, thereby generating additional steam.

Since some of the water used in the secondary loop 273 will be continuously lost, a water reservoir 282 which contains additional water for the secondary loop is connected between the condenser 278 and the pump 280 through a flow regulating valve 284.

Continuous purification of the water in the primary coolant loop 241 is obtained by bleeding some of the water from the loop between the pumps 244 and the reactor pressure vessel 20. This water is circulated through two serially connected heat exchangers 286 and 288 to an ion exchange demineralizer 290. The water is then circulated through a filter 292 and heated by circulation of the water through the heat exchanger 286. The water then flows through a flow restricting valve 294 to the inlet ends of the pumps 244.

Since the reactivity of the reactor increases as the temperature of the reactor falls, it is necessary to provide additional control means for the reactor to be used when the reactor is shut down or when the water temperature in the pressure vessel 20 falls below 450° F. For this purpose, a poison supply tank 296 is connected in parallel with the pumps 244 through valves 298 and 300. The tank 296 contains boric acid crystals which rapidly dissolve in the water primary coolant forming boric acid when the valves 298 and 300 are opened. Boric acid has a relatively high neutron capture cross section and reduces the reactivity of the reactor below critical at temperatures down to at least 68° F. A 50% saturated solution of boric acid crystals and water at a temperature of 68° F. is adequate for this purpose. The poison may be removed by draining the system, flushing it with water from the reservoir 282, and then removing the residual boric acid with the demineralizer 290.

The reactor is first brought to operation by bringing the temperature of the reactor up with the electrical heater 248. After the temperature of the reactor has been raised to 584° F. at a pressure of 3000 pounds per square inch, the reactor is in condition to commence a neutronic chain reaction. The pumps 244 and 280 maintain constant flows and the four control rods 142b, 142c, 142d and 142e are adjusted to bring the reactor to criticality with the rod 142a positioned approximately midway in the core 76 of the reactor at a reactor temperature of 617° F. If it is then desired to increase the power output of the reactor, the throttle 272 may be partially opened, as previously described. If the throttle 272 is closed, the temperature of the water in the primary coolant circuit entering the inlet port 28 of the reactor pressure vessel 20 will increase to cause the reactor to lose criticality.

Figure 9:
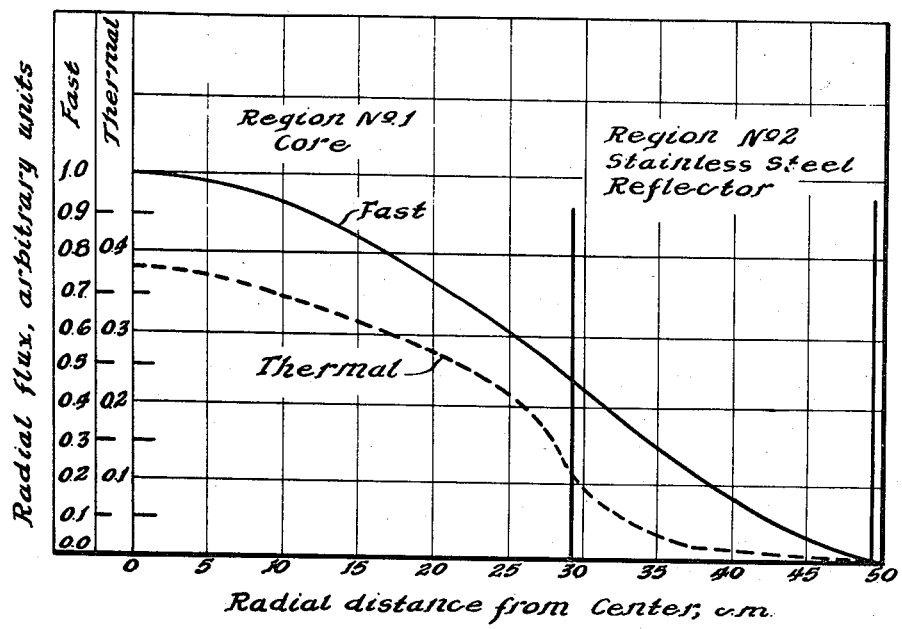
Figure 9 is a graph showing the fast neutron flux and thermal neutron flux distribution along a line normal to the axis of the pressure vessel passing through the center of the reactor core.

Figure 9 is a graph illustrating the fast and thermal neutron flux throughout the reactor core and reflector measured on an axis traversing the center of the reactor core.

Figure 10:
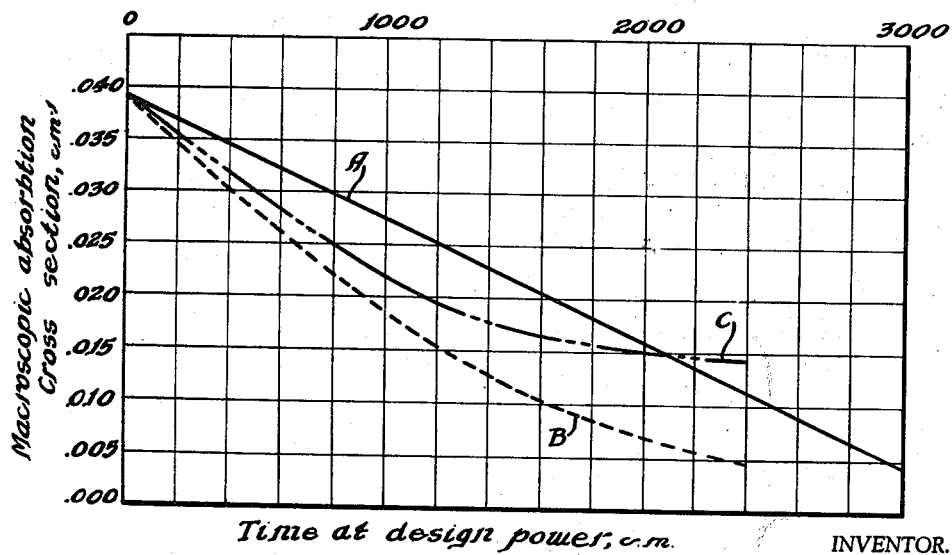
Figure 10 is a graph illustrating the relationship between the rate of fuel depletion and the rate of burnable poison depletion in the reactor core.

Figure 10 is a graph illustrating the effect of fuel depletion and burnable poison depletion over the operating period of the reactor. The abscissa of the graph in Figure 10 is in terms of hours of design power operation of the reactor disclosed above, and the ordinate is in terms of macroscopic absorption cross section of the fissionable material and burnable poison. Curve A indicates the form of a fuel depletion curve over this period of time, which is linear. Curve B illustrates the depletion of boron in the reactor described above over the design period of operation. It is to be noted, that curves A and B are equal at the beginning of the period, thereby indicating that the reactivity contribution of the fuel complement for fuel depletion is offset by the negative reactivity of the boron additive to the fuel elements.

The reactor herein described employs five mechanically positionable control rods 142, as stated above. It is to be noted that only control rod 142a which is disposed on the axis of the pressure vessel is employed for regulation of reactivity, and even in this case the rod is used as a "shim" rod and not a "regulating" rod. This rod 142a may thus be positioned to provide a step-wise change in reactivity, and further regulation of reactivity is accomplished by temperature control of the inlet coolant. This rod 142a could be eliminated from the reactor, but only at a cost of versatility, since temperature control would be employed to perform the entire regulating function. However, without a shim rod 142a the power output of the reactor would of necessity be affected by certain conditions, such as incomplete fuel depletion compensation by burnable poison, and difficulty in determining the operating point for the reactor, which can readily be taken care of by a single shim control rod. It is desirable to limit the reactivity of the reactor to a value just sufficient to produce the required maximum temperature to handle the load.

The control rods 142b, 142c, 142d, and 142e are used primarily for controlling the reactivity built into the reactor to overcome equilibrium fission products, such as xenon and samarium. Once the equilibrium condition has been achieved for these products, these control rods no longer require manipulation. Further, since the reactivity of the reactor decreases with the establishment of equilibrium fission product concentrations, these rods are at least partially withdrawn from the reactor core 76 during operation periods with equilibrium fission products in the reactor.

It is also to be noted that the fuel elements 139 dispose the fissionable material in fuel wires 196 which are disposed normal to the direction of coolant flow. As a result, the temperature differential between the coolant flow and the fuel wires 196 is approximately the same for all portions of a given fuel wire. As a result the temperature of each fuel wire is uniform throughout, thus eliminating thermal gradients along the axis of the fuel wires. Further, the fuel wires have large surface areas and the amount of heat which may be transferred from a fuel element 139 to the coolant approaches optimum. The fuel elements 139 also may be readily constructed at relatively small cost. This is due to the fact that expensive machining operations and handling operations are replaced by a relatively simple brazing process. Further, the fissionable material may be readily fabricated into the form here set forth.

The small core size of the reactor herein disclosed is also in part due to the presence of a water moderator. By utilizing an enriched reactor core which is water-moderated, a very small reactor core may be fabricated, thus providing a neutron leakage from the core which is highly temperature-sensitive. The described reactor has a negative temperature coefficient of reactivity of $$9 \times 10^{-4} \frac{\Delta K}{K}$$

per degree Fahrenheit in the operating region.

The reactor has many other advantages in addition to those specifically set forth herein. Also, the reactor may be constructed of other materials than those specifically set forth herein in accordance with knowledge and skills readily available in the art. For these reasons, it is intended that the scope of the present invention be not limited by the foregoing disclosure, but rather only by the appended claims.

What is claimed is:

1. A neutronic reactor comprising a tank, a plurality of concentric spaced coaxial steel sleeves disposed within the tank, the inner diameter of the inner sleeve being approximately 22.9 inches, a mass of water disposed in the tank and between the sleeves, means constructed of stainless steel defining a plurality of elongated parallel channels within the sleeves and parallel to the axes thereof, a plurality of wire grids disposed in abutting relationship within the channels normal to the axes thereof and extending to a height of 20.5 inches in each channel, each of said grids comprising a wire having a core of 17.6% $UO_2$ particles which contain uranium with 93.7% $U^{235}$ by weight, 83.3% stainless steel and 0.1% boron and a protective jacket of stainless steel disposed thereabout, said wire being provided with a plurality of bends in the same plane forming adjacent parallel sections between bends, and the sections of adjacent grids being normally disposed relative to each other.

2. A neutronic reactor comprising a tank, a plurality of concentric spaced coaxial steel sleeves disposed within the tank, the inner diameter of the inner sleeve being approximately 22.9 inches, a mass of water disposed in the tank and between the sleeves, means constructed of stainless steel defining a plurality of elongated parallel channels within the sleeves and parallel to the axes thereof, the central channel having an X-shaped cross section and being immediately surrounded by four rectangular channels, said means defining four X-shaped channels in a rectangular lattice about the central X-shaped channel and contiguous to the four rectangular channels surrounding the central channel, and a plurality of generally rectangular channels disposed about the four X-shaped channels, an X-shaped rod constructed of material having a neutron cross section of at least 100 barns disposed in each of the X-shaped channels, a plurality of wire grids disposed in abutting relationship within the rectangular channels normal to the axes thereof and extending to a height of 20.5 inches in each channel, each of said grids comprising a wire having a core of 17.6% $UO_2$ particles which contain uranium with 93.7% $U^{235}$ by weight, 83.3% stainless steel and 0.1% boron and a protective jacket of stainless steel disposed thereabout, said wire being provided with a plurality of bends in the same plane forming adjacent parallel sections between bends, and the sections of adjacent grids being normally disposed relative to each other.

3. A neutronic reactor comprising a tank, a plurality of concentric spaced coaxial stainless steel sleeves disposed within the tank, the inner diameter of the inner sleeve being approximately 22.9 inches, a mass of water disposed in the tank and between the sleeves, means constructed of stainless steel defining a plurality of elongated parallel channels within the sleeves and parallel to the axes thereof, a plurality of wire grids disposed in abutting relationship within the channels normal to the axes thereof and extending to a height of 20.5 inches in each channel, each of said grids comprising a wire having a core of 17.6% $UO_2$ particles which contain uranium with 93.7% $U^{235}$ by weight, 83.3% stainless steel and 0.1% boron and a protective jacket of stainless steel disposed thereabout, said wire being provided with a plurality of bends in the same plane forming adjacent parallel sections between bends, and the sections of adjacent grids being normally disposed relative to each other, means to flow water into the tank adjacent to one end of the channels, and means to flow water out of the reactor adjacent to the other end of the channels.

4. A neutronic reactor comprising a tank, a plurality of concentric spaced coaxial steel sleeves disposed within the tank, the inner diameter of the inner sleeve being approximately 22.9 inches, a mass of water disposed in the tank and between the sleeves, means constructed of stainless steel defining a plurality of elongated parallel channels within the sleeves and parallel to the axes thereof, a plurality of wire grids disposed in abutting relationship within the channels normal to the axes thereof and extending to a height of 20.5 inches in each channel, each of said grids comprising a wire having a core of 17.6% $UO_2$ particles which contain uranium with 93.7% $U^{235}$ by weight, 83.3% stainless steel and 0.1% boron and a protective jacket of aluminum disposed thereabout, said wire being provided with a plurality of bends in the same plane forming adjacent parallel sections between bends, and the sections of adjacent grids being normally disposed relative to each other, and a closed circulating system including a heat exchanger connected to the tank in series with the channels therein, whereby the amount of heat extracted by the heat exchanger controls the reactivity of the reactor.

References Cited in the file of this patent

UNITED STATES PATENTS 2,708,656   Fermi et al. _____ May 17, 1955

OTHER REFERENCES

The Reactor Handbook, vol. 2, Engineering, declassified edition, May 1955, Technical Information Service, U.S. Atomic Energy Commission. Library date September 8, 1955. Pages 464, 468.

Proceedings of the International Conference on the Peaceful Uses of Atomic Energy, vol. 3, Power Reactors. Held in Geneva August 8–20, 1955, United Nations, N.Y. (1955). Pages 214–220.

Nuclear Power, vol. 1, No. 3 (July 1956), page 129.